UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM CHLORID AND THE LIKE.

1,305,642.     Specification of Letters Patent.     Patented June 3, 1919.

No Drawing.     Application filed June 6, 1916. Serial No. 101,924.

*To all whom it may concern:*

Be it known that I, EDWIN O. BARSTOW, a citizen of the United States, and a resident of Midland, county of Midland, State of Michigan, have invented a new and useful Improvement in Methods of Making Magnesium Chlorid and the like, of which the following is a specification, the principle of the invention being herein explained and the best mode in which I have contemplated applying that principle, so as to distinguish it from other inventions.

The present invention, relating as indicated to the making of magnesium chlorid and the like, consists, in effect, of a modification of the general process for making this product described in my co-pending application filed June 6, 1916, Serial No. 101,923. The object of the invention is to provide a method or process for the production of magnesium chlorid, either in solid form or in solution, from any brine containing calcium chlorid, as for example from the natural brines which occur in the Michigan district, and contain, in addition to calcium chlorid, magnesium chlorid and sodium chlorid as well as a trace of iron chlorid. The object of the invention is not merely to secure magnesium chlorid as an ultimate product, but incidentally to produce by-products of value, thereby obviously decreasing the cost of manufacture of both such products.

To the accomplishment of the foregoing and related ends, said invention, then, consists of the steps hereinafter fully described and particularly pointed out in the claims, the following description setting forth in detail certain steps embodying the invention, but such described steps constituting only one of various ways in which the principle of the invention may be used.

In carrying out my improved method, whether working with a brine containing calcium chlorid alone or in conjunction with sodium and magnesium chlorids, I first treat such brine with a suitable acid sulfate, as for example niter cake, which is sodium acid sulfate ($NaHSO_4$). The reaction, where such niter cake is added directly to the chlorid, may be represented as follows:

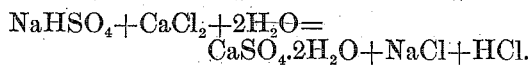

The calcium sulfate resulting from the foregoing reaction is separated from the mixture by filtration, and, after being washed with water, gives a product commercially used as a paper filler.

The filtrate remaining, then, contains the sodium chlorid and hydrochloric acid resulting from the foregoing reaction, and in addition such sodium chlorid and magnesium chlorid, if any, as were present in the original brine. There will also be a little calcium sulfate in the solution, due to the solubility of the latter in the presence of the acid brine.

The next step in the process consists in adding to such solution a magnesium compound capable of neutralizing hydrochloric acid to form magnesium chlorid, such compound being added in quantity sufficient to neutralize the free hydrochloric acid present in such solution. Magnesium oxid, carbonate or hydrate, for example, may be thus used, the latter being preferred in practice, in which event the reaction is as follows:

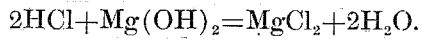

As indicated, the hydrochloric acid reacts with the magnesium hydrate to form magnesium chlorid, and at the same time the neutralization of such acid decreases the solubility of the calcium sulfate which was in solution, causing a considerable portion of it to be precipitated as calcium sulfate ($CaSO_4.2H_2O$), although there still remains a small quantity in the solution. For some uses the presence of this small quantity of the calcium sulfate is not objectionable, and in such case the residual solution may be at once evaporated until the sodium chlorid separates out, this taking place at a gravity of about 34° Bé. The magnesium chlorid mother liquor thus left may then, in turn, be evaporated down until it corresponds in composition to magnesium chlorid with water of crystallization represented by the formula ($MgCl_2.6H_2O$) when it may be drawn off into drums and allowed to cool and solidify.

In case, however, it is preferred to remove the last of the calcium in solution, this may be accomplished by adding magnesium sulfite to such solution, the resulting reaction being represented as follows:—

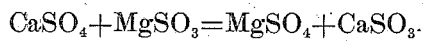

The magnesium sulfite, which thus results, will of course remain and appear in the magnesium chlorid which forms the final product, but the quantity will be very small and is not as objectionable as would be the calcium sulfate.

Where it is desired to produce magnesium carbonate from magnesium chlorid, it is not necessary to evaporate the solution to remove the salt, but magnesium carbonate can be precipitated directly from the brine by means of sodium carbonate and then separated from the salt brine by filtration and washing.

Instead of reacting first between the calcium chlorid and niter cake, the latter may be first neutralized with magnesium hydrate forming a solution of magnesium sulfate and sodium sulfate according to the following reaction:—

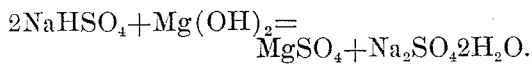
$$2NaHSO_4 + Mg(OH)_2 = MgSO_4 + Na_2SO_4 2H_2O.$$

This solution of mixed sulfates may then be added to a calcium chlorid brine, whereupon magnesium chlorid is formed in accordance with the following reaction:—

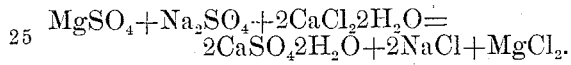
$$MgSO_4 + Na_2SO_4 + 2CaCl_2 2H_2O = 2CaSO_4 2H_2O + 2NaCl + MgCl_2.$$

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of making magnesium chlorid from a solution containing calcium chlorid which consists in reacting between such chlorid, magnesium hydrate, and an alkali metal acid sulfate, in such order as to precipitate calcium sulfate and leave magnesium chlorid in solution, substantially as described.

2. The method of making magnesium chlorid from a solution containing calcium chlorid which consists in reacting between such chlorid, magnesium hydrate and sodium acid sulfate, in such order as to precipitate calcium sulfate and leave magnesium chlorid in solution, substantially described.

3. In a method of making magnesium chlorid from a brine containing calcium chlorid, the steps which consist in adding an alkali metal acid sulfate to such brine, whereby calcium sulfate is precipitated with formation of hydrochloric acid in solution; separating out such calcium sulfate and adding to the solution a magnesium compound adapted to neutralize such acid with formation of magnesium chlorid.

4. In a method of making magnesium chlorid from a brine containing calcium chlorid, the steps which consist in adding sodium acid sulfate to such brine, whereby calcium sulfate is precipitated with formation of hydrochloric acid in solution; separating out such calcium sulfate and adding to the solution a magnesium compound adapted to neutralize such acid with formation of magnesium chlorid.

5. In a method of making magnesium chlorid from a brine containing calcium chlorid, the steps which consist in adding sodium acid sulfate to such brine whereby calcium sulfate is precipitated with formation of hydrochloric acid in solution separating out such calcium sulfate and adding to the solution a quantity of magnesium hydrate sufficient to neutralize such hydrochloric acid with formation of magnesium chlorid.

Signed by me, this 2d day of June, 1916.

EDWIN O. BARSTOW.

Attested by—
C. E. BARNES,
J. P. HOLMES.